April 28, 1970     R. G. STEIMER ET AL     3,509,312
TRANSFORMER AND LEAD ARRANGEMENT FOR ELECTRIC WELDING
EQUIPMENT AND THE LIKE
Filed Oct. 21, 1966     2 Sheets-Sheet 1
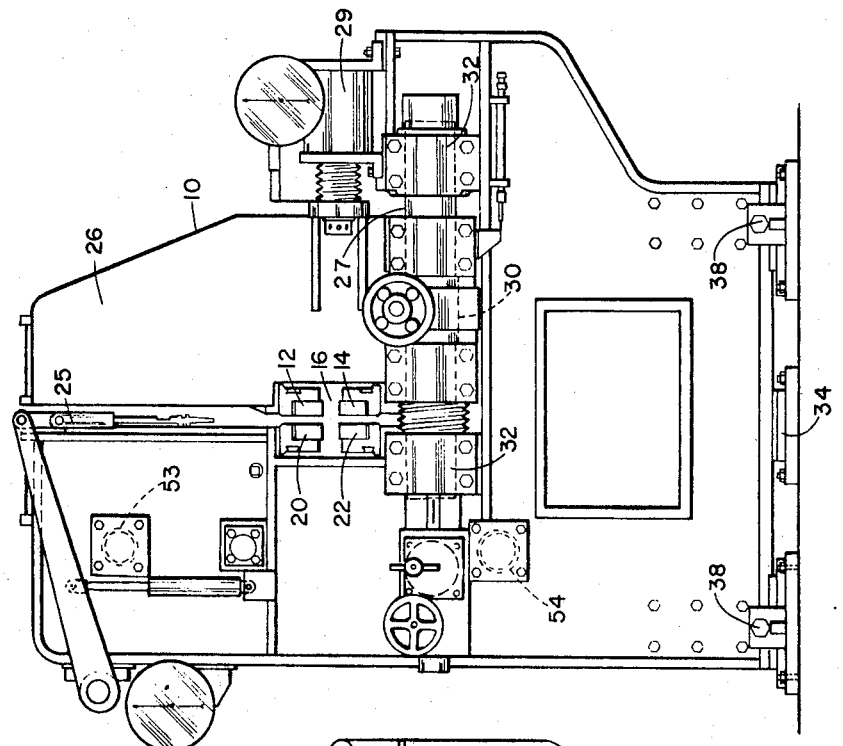
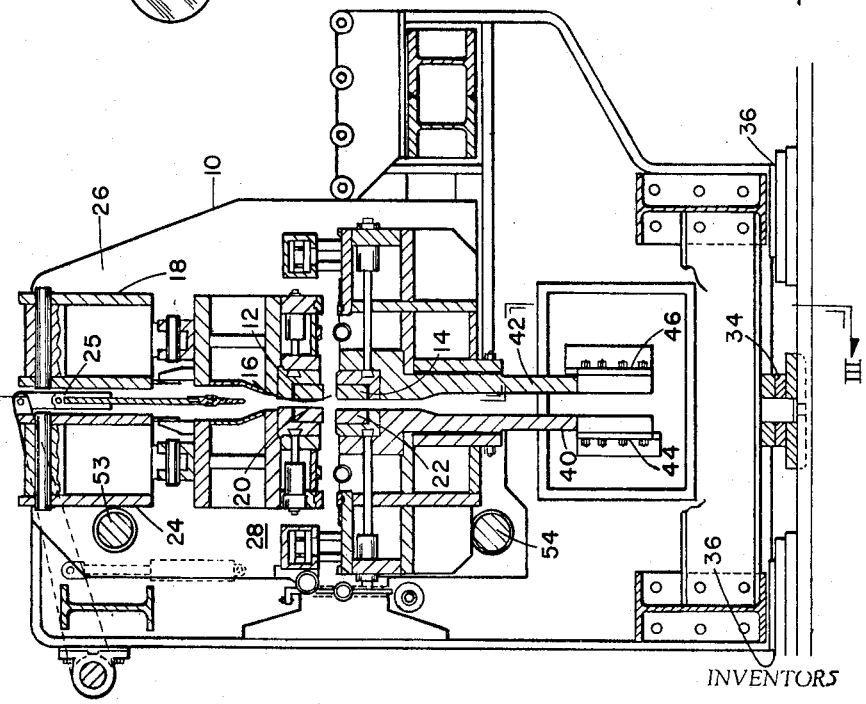
INVENTORS
Robert G. Steimer
Paul M. Lowy

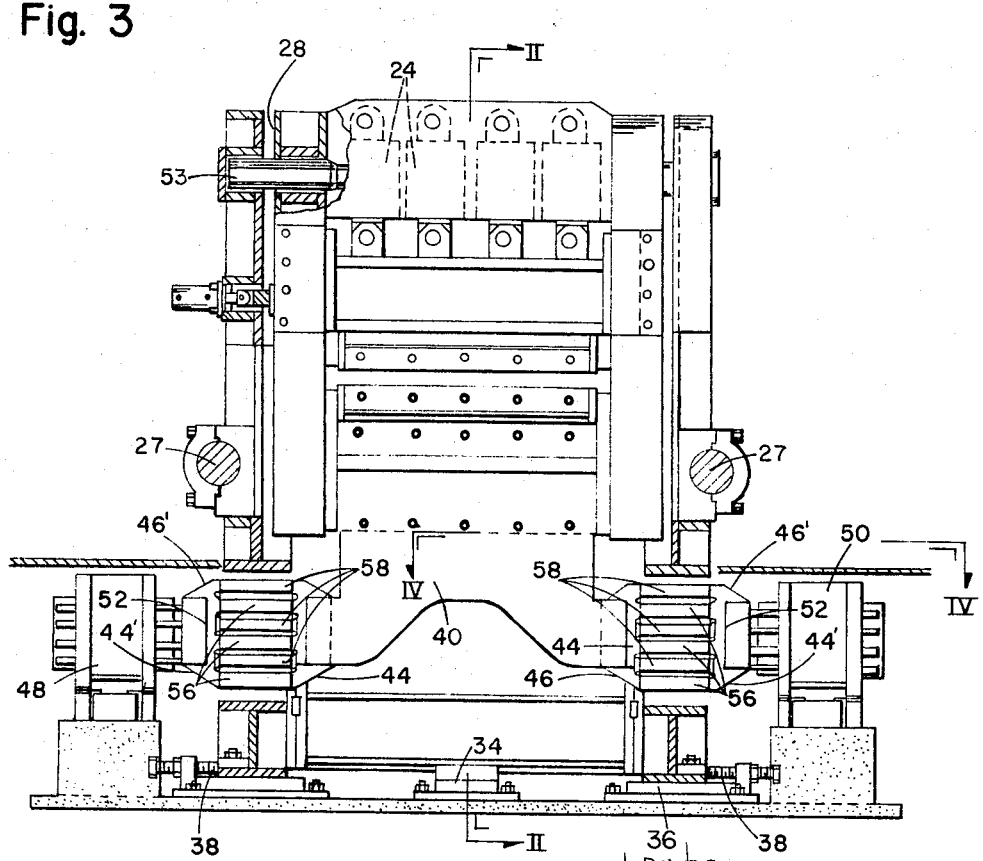
Fig. 3
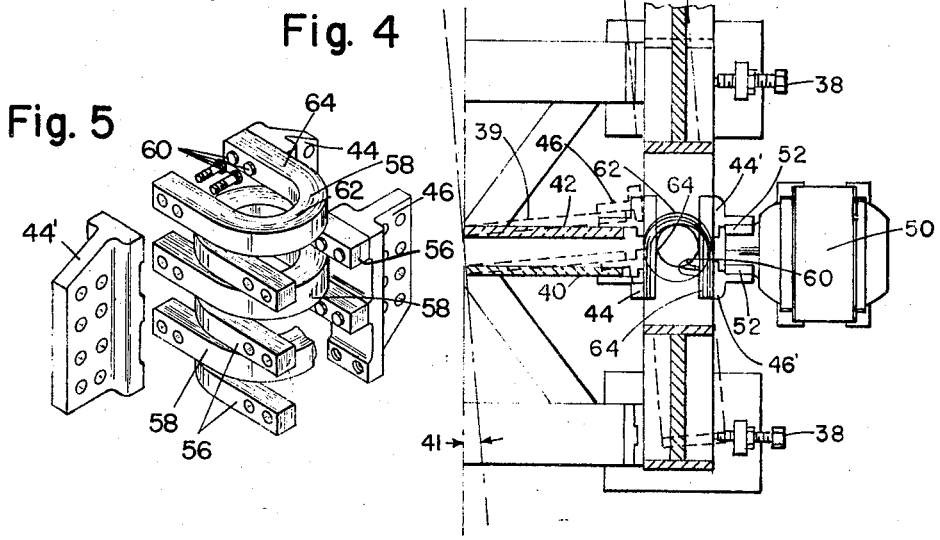
Fig. 4
Fig. 5
INVENTORS
Robert G. Steimer
Paul M. Lowy

United States Patent Office 3,509,312
Patented Apr. 28, 1970

3,509,312
TRANSFORMER AND LEAD ARRANGEMENT FOR ELECTRIC WELDING EQUIPMENT AND THE LIKE
Robert G. Steimer and Paul M. Lowy, Pittsburgh, Pa., assignors to Mesta Machine Company, Pittsburgh, Pa.
Filed Oct. 21, 1966, Ser. No. 588,407
Int. Cl. B23k *11/24*
U.S. Cl. 219—116                    9 Claims

ABSTRACT OF THE DISCLOSURE

We disclose a flexible lead arrangement for high current systems, said lead arrangement comprising a plurality of flexible conductors each having a looped portion therein, each of said conductors being secured at positions adjacent said looped portion respectively to an output terminal means of a current source and to an input terminal means of a load device, said conductors being disposed in a spaced substantially parallel array to permit substantially universal relative movement between said source and said load device.

---

The present invention relates to flexible transformer and lead arrangements and more particularly to such arrangements for supplying electric current to the welding dies of electric welding apparatus or the like. The invention is especially useful in welding apparatus wherein the welding dies are subjected to vibration and other motion or wherein one or more of the dies are intentionally moved in one or more directions relative to the remaining dies or relative to a stationary transformer system.

In welding apparatus for welding a pair of objects together, pairs of dies are usually provided for clamping the objects therebetween respectively. One pair of dies is movable toward and away from the other pair of dies so that the objects can be brought into welding contact. Existing welding apparatus employs relatively fixed connections or leads between the transformer and dies. Although such relatively fixed leads can accommodate a limited range of die movement and are suitable for many welding arrangements, the leads, however, are subject to wear because of the movement imparted thereto. In other welding operations it is necessary or desirable to anneal the welded objects after the weldment is made, and for this purpose a much greater separation between the pairs of dies is necessary. Conventional transformer and lead arrangements are not sufficiently flexible to provide for the required additional separation occasioned by the annealing operation.

In more sophisticated welding apparatus, such as that employed for welding metallic strip and described and claimed in a copending and co-assigned application of Charles M. Senn and Owen S. Cecil, Jr. entitled Flash Strip Welder and filed concurrently herewith, Ser. No. 588,485 or in the copending and co-assigned application of Charles M. Senn and Owen S. Cecil entitled Side Shifting Strip Welding Apparatus and filed concurrently herewith, Ser. No. 588,484 the pairs of welding dies are subjected to additional relative movements therebetween for adjustment purposes. For example, one pair of the welding dies are moved longitudinally of the other pair of dies to permit longitudinal alignment of the strip ends. In addition, the elevation of one of the bottom dies can be varied relative to the other bottom die in order to adjust the elevation of one of the strip ends relative to the other. Finally, the entire welding apparatus can be pivoted to align the welding dies parallel to the strip ends or generally transversely of the path of strip movements. These additional relative movements of the welding dies together with the conventional separatory movements thereof and the pivotal movement of the entire welding apparatus as disclosed in the copending applications necessitates the provision of transformer leads which are sufficiently flexible in all directions in order to accommodate the various separatory, adjustment, and other movements imparted to the welding dies. Finally, it is necessary to attain the required transformer lead flexibility in a manner which provides a minimum of inductive losses and which utilizes a minimum of floor space.

In order to overcome these problems of the prior art, we have provided a transformer and lead arrangement wherein the tarnsformer leads are arranged for flexibility in every anticipated direction, i.e., for universal flexibility, and wherein the transformer leads are further arranged so that the inductive losses are largely cancelled or otherwise minimized. In this connection the transformer lead structure utilizes a minimum of component parts and includes a number of interleaved, reversely curving or looped conductors coupled respectively between the welding dies on the one hand and the secondary transformer terminals on the other. The transformer and lead arrangement is further disposed so that a pair of transformers can be coupled in parallel to the welding dies where desired to supply additional welding current. Our arrangement not only provides the essential flexibility of the transformer leads but also permits location of the transformer or transformers and leads within a minimum of floor space and in readily accessible positions for subsequent maintenance or replacement.

In the foregoing discussion various objects, features and advantages of the invention have been alluded to. These and other objects, features and advantages of the invention will be elaborated upon during the forthcoming description of presently preferred modifications of the invention together with presently preferred methods of practicing the same.

In the accompanying drawings, we have shown certain presently preferred modifications of the invention and have illustrated certain presently preferred methods of practicing the same wherein:

FIGURE 1 is a side elevational view of one form of welding apparatus constructed in accordance with our invention;

FIGURE 2 is a vertically sectioned view of the apparatus as shown in FIGURE 1 and taken generally along reference line II—II of FIGURE 3.

FIGURE 3 is a vertically sectioned view of the apparatus as shown in FIGURE 2 and taken generally along reference line III—III thereof;

FIGURE 4 is a cross-sectional view of the apparatus as shown in FIGURE 3 and taken along reference line IV—IV thereof; and, FIGURE 5 is an enlarged partially exploded isometric view of the flexible secondary leads 56, 58 and their brackets 44, 46 as shown in FIGURES 3–4, with parts being broken away in FIGURE 5 and other parts removed to show the invention more closely.

The transformer and lead arrangement of our invention is described herein primarily with reference to electric welding apparatus for welding strip material, which apparatus may be either conventional or that described and claimed in the aforementioned copending applications. It will be understood, of course, that the principles of our invention can be utilized in arranging flexible electrical connections to many other types of electrical machinery.

Referring now more particularly to the drawings and initially to FIGURE 1 thereof, the welding apparatus 10 shown therein comprises a first pair of die assemblies 12 and 14, of which the upper die assembly 12 can be moved vertically in this example to open and close the space 16 between the vertically paired dies 12, 14. This can be accomplished for example by a bank of cylinders and pistons denoted generally by reference character 18. The welding apparatus 10 includes a second pair of dies 20, 22, the upper die 20 of which can be similarly raised and lowered by means of a similar piston and cylinder arrangement 24. A housing or support 26 for the first-mentioned dies 12, 14 is movable longitudinally and horizontally in order to advance and withdraw the dies 12, 14 relative to the dies 20, 22 for normal welding operations as determined by use of a strip gauge mechanism denoted generally by reference character 25, or for annealing operations. The longitudinally movable housing 26 is mounted for such movement on a pair of longitudinal shafts 27 and such movement is controlled by a pair of cylinders 29, one of which is shown in FIGURE 1.

Additionally, the last-mentioned pair of dies 20, 22 are mounted, in this example, in a side-shifting housing or support 28 whereby the dies 20, 22 can be moved longitudinally of the other pair of dies or transversely of the path of the strips to be joined. The side-shifting housing is slidably mounted on a pair of transverse shafts 53, 54 as better shown in FIGURES 2 and 3 of the drawings.

One of the lower die assemblies 14 or 22 is mounted for vertical movement so that the last-mentioned die assembly can be adjusted to the same elevation of the other die assembly. In furtherance of this purpose the longitudinally movable housing 26 is mounted upon an eccentric portion 30 of the shafts 27 and the latter are both rotatably and slidably mounted on the shaft housing 32 to provide both longitudinal and vertical movements of the housing 26.

These and other mechanical and structural details of the welding apparatus 10 are elaborated upon and claimed in the aforementioned copending applications.

The entire welding apparatus 10 can be pivoted for transverse alignment of the welding dies 12, 14 and 20, 22 transversely of the path of the strip by means of central pivot mounting 34 and wear strips 36 (FIGURES 1–3). The rotative position of the welding apparatus 10 on its pivot mounting 34 is adjusted and maintained by means of adjustment screws 38 as better shown in FIGURES 3 and 4 of the drawings. This arrangement permits the welding apparatus 10 including the aforementioned dies to be pivotally adjusted so as to lie parallel to the juxtaposed leading and tail edges of the strips by angle 41 of FIGURE 4, which edges, in many applications, desirably are trimmed so as to be parallel to one another but not perpendicular to the lateral strip edges.

In this arrangement of the welding apparatus 10, the pivotal adjustment represented by chain outline 39 (FIGURE 4) is usually limited to a maximum of about 5° skew relative to the path of the strip. Usually it is desirable to trim and weld the strip ends along a line disposed at less than right angles to the center line of the strip so that the resulting weldment is not contacted simultaneously along its length by subsequent work rolls. The flexible transformer leads 56, 58 presently to be described permit such skew adjustment to be made without the necessity of also shifting the relatively heavy transformers 48, 50. Desirably, the leads extend generally in the direction of angular displacement of the welding apparatus 10, which in this example is transversely of the bus bars 40, 42 and transformer output terminals 52. Such arrangement places the greatest flexibility of the leads 56, 58, noted below, in the direction of such angular displacement, an important consideration in the case of the wider strip welders.

With reference now to FIGURES 2–4 of the drawings, our transformer and lead arrangement for the welding apparatus 10, includes bus bars 40 and 42 secured to the lower die assemblies 14 and 22 respectively in electrically conductive relationship. Each of the bus bars 40 and 42 has secured to its ends lead brackets 44 and 46 respectively. In this example, the brackets are substantially identical in configuration, and the bracket 44 is inverted relative to the bracket 46. In addition, the brackets 46 and 44 at adjacent ends of the bus bars 40, 42 are relatively inverted, as better shown in FIGURES 2 and 5.

In this example of our transformer and lead arrangement, a pair of transformers 48 and 50 are utilized, and are connected in electrical parallel bucking relation across the lower die assemblies 14, 22 in the manner described below. The circuit, of course, is completed when the strip ends or other objects are clamped respectively between the pairs of dies 12, 14 and 20, 22, and the pair of dies 12, 14 are moved toward the dies 20, 22 to bring the objects or strip ends into physical contact. Secondary terminals 52 (FIGURE 4) of each transformer 48, 50 are likewise provided with lead brackets 44' and 46', which in this example are similar to the lead brackets 44 and 46 of the bus bars 40 and 42. The transformer lead brackets 44', 46' are likewise inverted relative to one another but are shaped alloquirally to the respectively confronting bus bar brackets 46 and 44, as better shown in FIGURES 3 and 4 of the drawings.

A plurality of flexible leads 56, 58 are connected between each pair of juxtaposed brackets 44, 44' or 46, 46'. Each of the leads 56 and 58 in this example are of generally U-shaped construction as better shown in FIGURE 4, although other suitable configuration can be utilized depending upon space limitations and other requirements imposed by a specific application of the invention. An important consideration is that the leads 56 and 58 be provided with a loop or re-entrant configuration to endow the leads with the necessary flexibility such as that afforded by the bight portions 62, as described more fully below. Desirably, however, the leads 56 are of the same configuration as that of the leads 58 are desirably parallel thereto, and are arranged in an alternating, interleaved array therewith. In this example, the conductor or leads 56 and 58 are also desirably parallel to the plane defined by the proper positions of the lower dies 14, 22 or the path of the strip through the apparatus 10. This arrangement provides a compact assembly which minimized space requirements and at the same time affords the necessary flexibility to the transformer leads 56 and 58. Such flexibility permits relative movement in any direction not only between the lower die assemblies 22, 14 but also between either or both die assemblies 22 and 14 on the one hand and the transformers 48 and 50 on the other which usually are secured at stationary mounting positions.

The symmetrical and interleaved array of the transformer leads 56 and 58 also largely cancels inductive losses therein. This follows from the fact that adjacent conductors 56, 58 are of opposite polarity at a given instant. In furtherance of this purpose the conductors 56 are similarly shaped and in relatively reversed positions with respect to conductors 58. The vertical separation (as viewed in FIGURE 3) between adjacent conductors 56 and 58 is adequate to prevent contact and shorting therebetween during anticipated relative movements between the associated lead brackets and between the conductors 56, 58 secured thereto, as a result of adjustments in elevation of one lower die 14 or 22 relative to the other. However, the prevention of such contact can be further ensured by the provision of sheets of suitable electrically insulation material such as formica.

Each of the transformer leads or conductors 56 or 58 is a laminated structure made for example from bands or strips of copper to increase further the flexibility of the leads. The ends of each laminated lead 56 or 58 are secured with mounting bolts 60 or other suitable fastening means to a pair of juxtaposed terminals on the associated lead brackets 46, 46' or 44, 44'.

The die brackets 44 and 46 are spaced longitudinally of the welding dies a sufficient distance from the juxtaposed transformer brackets 44' and 46' so that the necessary flexibility of bight portions 62 and adjacent portions of legs 64 of each lead 56 or 58 is attained and that there is no possibility of contact between the inner surfaces of the legs 64 or of the mounting bolts 60 during side-shifting movements of the die assemblies 20, 22. Further, the bight and leg portions 62, 64 are of sufficient length in the path of strip or other object travel through the welding apparatus 10, so that the vertically paired dies 12, 14 and 20, 22 can be separated an additional distance in the horizontal direction for the aforementioned annealing operation without imparting undue bending stresses to the conductors 56 and 58 in the areas of their securance to the lead brackets. Thus, the conductors 56, 58 extend generally transversely of the dies 12, 14 and 20, 22 or generally in the direction of greatest relative movement between the transformer and bus bar terminals.

From the foregoing it will be apparent that novel and efficient welding apparatus has been disclosed herein, together with novel and efficient means and methods of supplying the necessary welding current thereto. The flexible transformer leads 56, 58 permit universal movement between the stationary transformer or transformers and the bus bars 40, 42 coupled to respective die assemblies of the welding apparatus. The transformer lead arrangement is fabricated from a relatively small number of component parts, and flexibility of the leads 56, 58 in any direction is obtained without the application of undue wearing or bending stresses to the leads or to the lead brackets or other components associated therewith. The interleaved arrangements of leads 56 and 58 of opposite polarity minimizes the induction losses in the system.

While we have shown and described certain presently preferred embodiments of the invention and have illustrated presently preferred methods of practicing the same it is to be distinctly understood that the invention is not limited thereto but may be otherwise variously embodied and practiced within the scope of the following claims.

We claim:

1. A flexible lead arrangement for high current systems, said lead arrangement comprising a plurality of flexible conductors each having a looped portion therein, each of said conductors being secured at positions adjacent said looped portion respectively to an output terminal means of a current source and to an input terminal means of a load device, said conductors being disposed in a spaced substantially parallel array to permit substantially universal relative movement between said source and said load device, said conductors being divided into two groups, one of said conductor groups being secured in electrical parallel between an output terminal of a given polarity and a related input terminal of said load device, the other conductor group being coupled in electrical parallel between an output terminal of generally opposite polarity and a second related input terminal of said load device, the shape of the first conductor group being generally similar to that of the second conductor group, said conductor groups being mounted in relatively closely spaced reversed positions relative to one another to minimize inductive losses.

2. The combination according to claim 1 wherein each of said conductor groups includes a plurality of substantially similar shaped conductors, the conductors of one of said groups being arranged in an alternating array with the conductors of the other of said groups further to minimize inductive losses.

3. The combination according to claim 1 wherein said conductors are of U-shaped configuration having bight and leg portions, and said leg portions are mounted respectively on transversely extending juxtaposed portions of a pair of conductor brackets, said brackets being mounted respectively on said terminals, each of said brackets having a longitudinally extending portion secured to the associated one of said terminals.

4. The combination according to claim 3 wherein each of said juxtaposed bracket portions have a plurality of terminals juxtaposed respectively with terminals on the other of said juxtaposed portions, and said conductors have their end portions secured respectively to juxtaposed pairs of said terminals.

5. The combination according to claim 1 wherein said load device includes a pair of movably mounted bus bars terminating in respective input terminals, and at least one transformer is stationarily mounted adjacent said bus bars and has output terminals spaced from said input terminals, said first and said second conductor groups being connected respectively therebetween.

6. In electric welding apparatus having a plurality of relatively movable clamping and welding dies, the combination comprising a pair of bus bars secured respectively to a pair of said dies, each of said bus bars terminating at a pair of input terminals, a pair of transformers stationarily mounted adjacent juxtaposed input terminals of said bus bars and having a secondary output terminals spaced therefrom, a plurality of conductors having looped portions and secured between the output terminals of each transformer and the associated input terminals of said bus bars, the terminals of each of said bus bars being connected to transformer terminals of similar polarity, said conductors being mounted in spaced substantially parallel relation to permit substantially universal relative movement between said bus bars and each of said transformers.

7. The combination according to claim 1 wherein said conductor loop portions extend generally in the direction of greatest anticipated relative movement between said output and said input terminals.

8. The combination according to claim 5 wherein welding die assemblies connected to said bus bars are disposed generally at the same elevation, means are provided for adjusting the elevation of one of said die assemblies relative to the other, said conductors are disposed generally parallel to the plane defined by said die assemblies, and the spacing between said conductors is greater than the range of elevational adjustment of said one die assembly.

9. The combination according to claim 6 wherein said welding apparatus is provided with means for pivotally mounting said apparatus, and said loop portions extend generally in the direction of angular displacement of said welding apparatus.

References Cited

UNITED STATES PATENTS

| 2,200,112 | 5/1940 | Gilbert | 219—81 |
| 2,443,077 | 6/1948 | Martin | 219—116 |
| 2,826,673 | 3/1958 | Matthes | 219—81 |
| 3,088,020 | 4/1963 | Cooper et al. | 219—119 |
| 3,125,622 | 3/1964 | Leigh et al. | 13—9 |

FOREIGN PATENTS

| 1,000,543 | 1/1957 | Germany. |
| 1,148,340 | 5/1963 | Germany. |
| 1,373,813 | 8/1964 | France. |

ANTHONY BARTIS, Primary Examiner

L. A. SCHUTZMAN, Assistant Examiner

U.S. Cl. X.R.

174—32; 219—88

UNITED STATES PATENT OFFICE
CERTIFICATE OF CORRECTION

Patent No. 3,509,312                                      April 28, 1970

Robert G. Steimer et al.

It is certified that error appears in the above identified patent and that said Letters Patent are hereby corrected as shown below:

Column 1, line 33, after "stationary" insert -- supply --. Column 2, line 13, "tarnsformer" should read -- transformer --.

Signed and sealed this 5th day of January 1971.

(SEAL)
Attest:

Edward M. Fletcher, Jr.                          WILLIAM E. SCHUYLER, JR.
Attesting Officer                                         Commissioner of Patents